United States Patent
Briggs

(10) Patent No.: US 11,343,707 B2
(45) Date of Patent: May 24, 2022

(54) SYSTEMS AND METHODS FOR VOICE NETWORK CONTROL AND OPTIMIZATION

(71) Applicant: Verizon Patent and Licensing Inc., Basking Ridge, NJ (US)

(72) Inventor: Charles D. Briggs, Haiku, HI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/018,091

(22) Filed: Sep. 11, 2020

(65) Prior Publication Data
US 2022/0086679 A1  Mar. 17, 2022

(51) Int. Cl.
*H04W 28/02* (2009.01)
*H04W 76/12* (2018.01)
*H04W 72/08* (2009.01)
*H04W 76/15* (2018.01)

(52) U.S. Cl.
CPC ..... *H04W 28/0268* (2013.01); *H04W 72/087* (2013.01); *H04W 76/12* (2018.02); *H04W 76/15* (2018.02)

(58) Field of Classification Search
CPC ........... H04W 28/0268; H04W 72/087; H04W 76/12; H04W 76/15
See application file for complete search history.

(56) References Cited

U.S. PATENT DOCUMENTS

| | | | |
|---|---|---|---|
| 9,826,072 B1* | 11/2017 | Filart | H04L 65/1046 |
| 2018/0048748 A1* | 2/2018 | Lundstrom | H04L 65/80 |
| 2018/0176266 A1* | 6/2018 | Filart | H04L 65/605 |
| 2018/0324235 A1* | 11/2018 | Mufti | H04L 65/1006 |
| 2019/0068676 A1* | 2/2019 | Kwok | H04L 69/08 |

* cited by examiner

*Primary Examiner* — Robert C Scheibel

(57) ABSTRACT

Provided is a controller for optimizing a wireless network by selectively enabling different codecs at different Radio Access Networks ("RANs"), and/or by dynamically provisioning resources to support interoperability between the selectively enabled codecs and other codecs in use elsewhere in the network. The controller may receive a request with an indication of a first codec and a second codec for establishing a session via a particular RAN. The controller may disable availability of the second codec for the session by providing a modified request that omits the second codec in response to the quality of service at the particular RAN satisfying performance criteria. The controller may selectively enable use of the second codec and provide transcoding between the first and second codecs by forwarding the request without modification to the session recipient in response to the quality of service at the particular RAN not satisfying the performance criteria.

20 Claims, 11 Drawing Sheets

SYSTEMS AND METHODS FOR VOICE NETWORK CONTROL AND OPTIMIZATION

BACKGROUND

A network carrier may support different coding and/or decoding techniques (e.g., "codecs"), and subscriber user equipment ("UE") may access voice and data services of the network carrier using one or more of the supported codecs. Different codecs are associated with different Quality of Service ("QoS") and/or performance-related characteristics or metrics, such as call quality, network reliability, network capacity, throughput, and/or other characteristics or metrics.

DETAILED DESCRIPTION OF THE PREFERRED EMBODIMENTS

Figure 1:
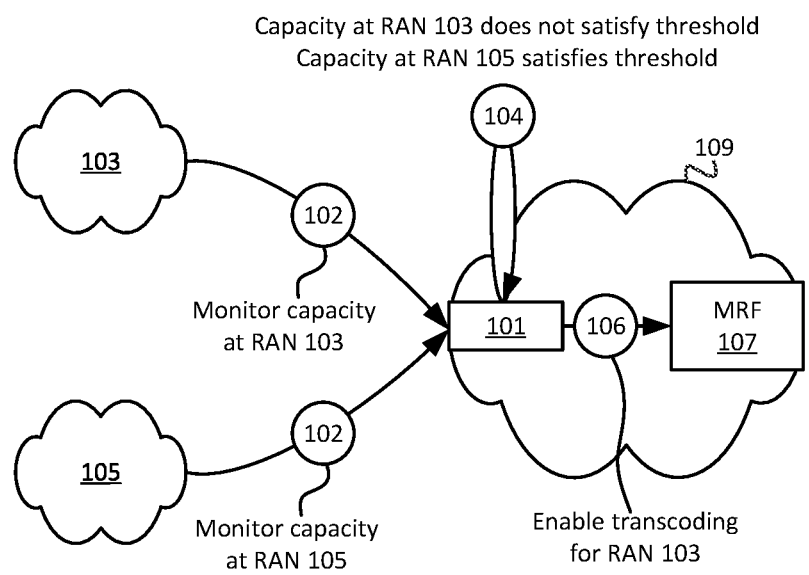
FIG. 1 illustrates an example of selectively enabling different audio codecs to increase network capacity at a congested Radio Access Network ("RAN") in accordance with some embodiments presented herein.

The following detailed description refers to the accompanying drawings. The same reference numbers in different drawings may identify the same or similar elements.

Systems and methods, described herein, provide for the optimization of one or more wireless networks by selectively enabling different codecs to improve capacity, reliability, and/or performance at different Radio Access Networks ("RANs") that experience issues impacting capacity, reliability, and/or performance, and/or by dynamically provisioning resources to support interoperability between the selectively enabled codecs and other codecs in use elsewhere in the network. The optimization of the wireless network may include configuration changes or other modifications to technologies used to carry voice services (e.g., voices calls) via the RANs of the wireless network.

For instance, the optimization may include selectively enabling a first codec at a first RAN that a first set of UEs, connecting to the network via the first RAN, may use to initiate a voice call, conference, session, and/or other suitable service. The optimization of some embodiments may further include allocating network resources to provide interoperability between the first set of UEs, that use the first codec, and a different second set of UEs, that use different codecs, to engage in the same voice call, conference, session, and/or other services with the first set of UEs.

In some embodiments, the optimization may be based on artificial intelligence and/or machine learning generated models that predict network events, such as capacity surges, service degradation, and/or performance issues at one or more RANs. In some such embodiments, the optimization may include preemptively selecting particular codecs, service features, and/or other technologies to improve capacity, reliability, and/or performance at the one or more RANs. In this manner, such events may be preemptively accounted for prior to the one or more RANs experiencing any such issues, and potential service disruptions or other user experience issues resulting from such events may be mitigated or avoided.

In some embodiments, a controller may control the selective enablement of different codecs, such as audio codecs to apply to voice calls, and/or may dynamically provision resources at one or more RANs. The controller may monitor consumption and/or performance at different RANs, and may detect one or more RANs that provide or are expected to provide a degraded user experience based on the monitored consumption and/or performance. For instance, the controller may detect one or more RANs with available capacity that does not satisfy a capacity threshold (e.g., congested RANs with insufficient radio frequency ("RF") spectrum, RANs with at least a threshold quantity of connected UEs, RANs with at least a threshold quantity or proportion of used resources, or the like), and/or one or more RANs where frame loss, a number of dropped calls, and/or other performance, reliability, Quality of Service ("QoS"), and/or other suitable types of metrics do not satisfy a respective threshold level. In accordance with some embodiments, the controller may selectively enable a first codec at the one or more RANs. The selectively enabled first codec may lower latency, reduce packet loss, lower bandwidth consumption, improve reliability, and/or otherwise improve the user experience relative to at least a second codec that is currently being used by UEs connected to the one or more RANs to access voice and/or data services. However, the first codec may be incompatible with the second codec such that the first codec may not be used by a first set of UEs to engage in the same call, conference, session, and/or other service with a second set of UEs using the second codec. Accordingly, the controller may control the allocation of network transcoding, translation, and/or other conversion resources to provide interoperability between the first set of UEs, that use the first codec to send and/or receive voice call traffic associated with a particular call, conference, session, and/or other service via network connectivity provided by the one or more RANs, and the second set of UEs, that use the second codec to participate in the same call, conference, session, and/or other service via network connectivity provided by other RANs or networks.

For instance, Enhanced Voice Services ("EVS") is an example codec that UEs may use in place of other codecs, such as Adaptive Multi-Rate Wideband ("AMR-WB"), to access telephony, conference, and/or other voice services. EVS may exhibit improved voice service reliability relative to AMR-WB and/or other codecs because of lower supported bitrates, efficient and adaptive compression (e.g., variable bit-rate ("SC-VBR") compression), voice/sound activity detection ("VAD"), comfort noise generation ("CNG"), error concealment ("EC"), channel-aware mode, jitter buffer management ("JBM"), and/or other features. Some UEs may not implement or otherwise support EVS. Further, EVS may not be directly compatible with AMR-WB and/or other codecs.

Accordingly, to promote the adoption of EVS and ensure the interoperability of EVS with other codecs used by other UEs, the controller of some embodiments may dynamically enable use of EVS by a first set of UEs that access services from a subset of RANs where AMR-WB consumes too much capacity or provides poor reliability, and may dynamically allocate resources to transcode between EVS calls originated from the subset of RANs and other call participants that use AMR-WB encoded audio.

In this manner, the controller of some embodiments may preserve transcoding resources or other resources for codec interoperability, and may allow a network to support EVS-to-AMR-WB and/or other codec interoperation without the cost and time associated with a full network-wide deployment of transcoding resources. Instead, the controller can dynamically and efficiently utilize processing and/or transcoding resources by selectively enabling EVS calling at different RANs that may benefit from the additional capacity provided by the reduced bitrates or variable compression provided by EVS, or that are in need of improved reliability provided by improved error loss management and jitter control of EVS. The examples described herein are in the context of the EVS and AMR-WB codecs. In practice, similar concepts may apply to different one or more different codecs.

FIG. 1 illustrates an example of controller 101 selectively provisioning different audio codecs to increase network capacity at a congested RAN in accordance with some embodiments presented herein. As shown in FIG. 1, controller 101 may be communicatively coupled to first RAN 103, second RAN 105, and Media Resource Function ("MRF") 107.

Controller 101 and/or MRF 107 may include components within core network 109, which may be communicatively coupled to RAN 103 and/or RAN 105. In some embodiments, controller 101 may be implemented by, and/or may communicate with, an Internet Protocol Multimedia Subsystem ("IMS") network included in or communicatively coupled with core network 109. MRF 107 may include an MRF controller ("MRFC") and an MRF processor ("MRFP") that collectively provide UEs (e.g., via RAN 103 and/or RAN 105) with multimedia communication services, such as voice, video, and text messaging, over Internet Protocol ("IP") networks. In particular, the MRFP may transcode between different codecs used by different call participants on the same call, conference, session, and/or other voice service. MRF 107 may be a limited resource in the sense that MRF 107 may be unable to support all active calls, sessions, and/or services of the network. For instance, the MRFP of MRF 107 may transcode less than the total or average number of active calls within the network that use different codecs. In this manner, MRF 107 may generally provide its suitable services in a prioritized manner (e.g., where such services may provide the most impact to users' experiences).

First RAN 103 and second RAN 105 may correspond to different service regions, cells, and/or Radio Access Technologies ("RATs"). UEs, such as mobile telephones, tablets, or the like, may wirelessly connect to first RAN 103, second RAN 105, and/or other RANs in order to access voice and/or data services provided by elements of core network 109.

Controller 101 may monitor (at 102) capacity and/or resource consumption at first RAN 103 and second RAN 105 during a first period of time. During the first period of time, UEs that are connected to first RAN 103, second RAN 105, and/or other RANs, may use a first audio codec (e.g., AMR-WB codec) in order to access IP-based telephony services, such as Voice over Long-Term Evolution ("VoLTE") voice calls, Voice over New Radio ("VoNR") voice calls, and/or other voice services.

Controller 101 may obtain total call volume, spectrum availability, and/or other data for the IP-based telephony and/or other voice services that are accessed through first RAN 103 and second RAN 105. In some embodiments, controller 101 may obtain the capacity and/or consumption data from base stations (e.g., evolved Node Bs ("eNBs"), Next Generation Node Bs ("gNBs"), or the like) of each RAN, network databases, and/or other components within the core network that track the capacity and/or utilization at first RAN 103 and second RAN 105.

Controller 101 may determine (at 104) that capacity, consumption, and/or other performance-based metrics of first RAN 103 do not satisfy a set of performance criteria, and may further determine that such performance-based metrics (e.g., the same metrics, and/or different metrics) at second RAN 105 satisfy a set of performance criteria (e.g., the same set of performance criteria for first RAN 103, or different performance criteria). For instance, first RAN 103 may experience a heavier call volume than second RAN 105, and may have less available capacity than second RAN 105 as a result of the heavier call volume.

To reduce congestion at first RAN 103, controller 101 may selectively enable (at 106) a different second codec (e.g., EVS codec) for use with IP-based telephony and/or other voice services that have a terminating endpoint at first RAN 103. For example, controller 101 may provide an instruction to RAN 103, and/or to UEs coupled to RAN 103, to utilize the second codec in lieu of the first codec. In some embodiments, controller 101 may add first RAN 103 to a list of RANs where use of the second codec is supported, and/or may allocate resources of MRF 107 to provide interoperability between the first and second codecs for the IP-based telephony and/or voice services terminating at first RAN 103. Providing interoperability may include transcoding between incompatible audio codecs used by different UEs so that the different UEs can seamlessly communicate and/or participate on the same call, conference, session, and/or other service.

The second codec may support lower bitrates and more efficient compression than the first codec that was in use during the first period of time. Accordingly, by selectively enabling (at 106) the second codec for use with the IP-based telephony and/or other voice services that are accessed from first RAN 103, controller 101 may increase capacity at first RAN 103 by reducing the amount of spectrum that is consumed at first RAN 103 by each of the accessed IP-based telephony and/or other voice services.

Figure 2:
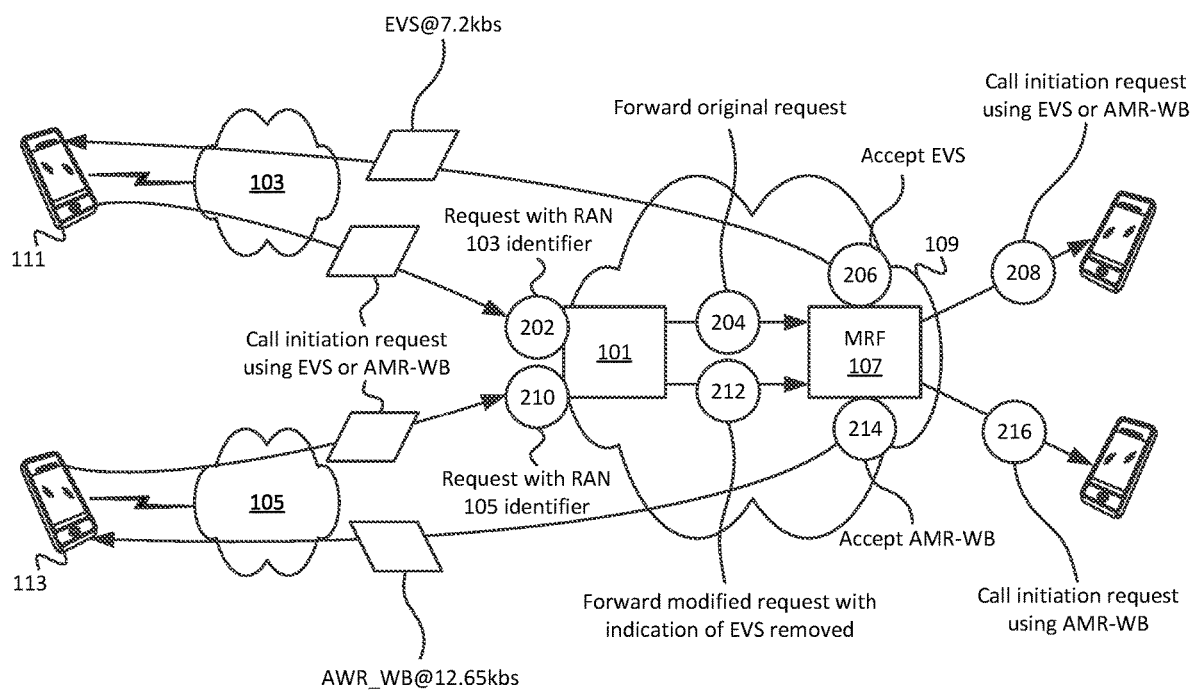
FIG. 2 illustrates an example of dynamically provisioning network resources based on the selectively enabled codecs in accordance with some embodiments presented herein.

FIG. 2 illustrates an example of controller 101 dynamically provisioning network resources based on the selectively enabled codecs in accordance with some embodiments presented herein. As shown in FIG. 2, UE 111 may connect to first RAN 103, and may issue a first request to initiate a first session using one of the second codec or the first codec supported by UE 111. The first session may correspond to a voice call (e.g., VoLTE call or VoNR call) or other IP-based telephony service. Controller 101 may receive (at 202) the first request (and/or may receive an indication that RAN 103 received the first request), may determine that the first request originates from first RAN 103, may determine that first RAN 103 is within the list of RANs where use of the second codec is supported, and may allocate (at 204) transcoding resources of MRF 107 to the first session. For example, controller 101 may add first RAN 103 or an identifier of first RAN 103 to the list of RANs upon detecting congestion and/or a lack of available spectrum at first RAN so that session requests, that identify first RAN 103 or that include the identifier of first RAN 103, may be identified as originating from a RAN where transcoding has been enabled. Controller 101 may allocate (at 204) the transcoding resources by forwarding the first request to MRF 107. In some embodiments, RANs, other than first RAN 103 that have sufficient available capacity and/or provide acceptable service reliability, may not have resources of MRF 107 allocated for transcoding between the first and second codecs. In this manner, the transcoding by MRF 107 may be selectively performed in appropriate circumstances.

In response to receiving the first request, MRF 107 may provide (at 206) a first response to UE 111 that indicates accepted use of the second codec. Based on the indicated acceptance of the second codec in the first response, detecting congestion at the first RAN, and/or a lack of available spectrum at the first RAN, UE 111 may select the second codec over the first codec and/or other codecs supported by UE 111 for the first session. MRF 107 may also forward (at 208) an indication of the first request to any UEs that are identified in the first request as recipients of and/or participants to the first session (referred to herein as "UE recipients"). The UE recipients may join the first session (e.g., voice call, conference, etc.) using any of the first codec or second codec identified in the unmodified first request. Should a UE recipient join the first session using the first codec, MRF 107 may transcode between the second codec used by UE 111 and the first codec used by the UE recipient. Should a UE recipient join the first session using the second codec, MRF 107 may perform transcoding pass-through allowing the encoded voice packets from UE 111 to pass unmodified to the UE recipient.

Also shown in FIG. 2, UE 113 may connect to second RAN 105, and may issue (at 210) a second request to initiate a second session using one of the second codec or the first codec supported by UE 113. Controller 101 may receive (at 208) the second request, may determine that the second request originates from second RAN 105, may determine that second RAN 105 is not within the list of RANs where use of the second codec is supported (e.g., the list of RANs that includes RANs with capacity, consumption, and/or other performance-based metrics that do not satisfy the set of criteria), and may modify (at 212) the session establishment procedure to force use of the first codec by UE 113 instead of the requested second codec. In some embodiments, controller 101 may modify (at 212) the session establishment procedure by removing the indication of the second codec from the second request, such that the modified second request indicates only the first codec, and not the first and second codecs as originally indicated by UE 113. Controller 101 may provide (at 212) the modified second request instead of the original second request from UE 113 to MRF 107. In response to the modified second request, MRF 107 may provide (at 214) a second request response to UE 113 that indicates accepted use of the first codec, and that effectively prevents allocation of MRF's 107 transcoding resources for the second session initiated by UE 113. MRF 107 may provide (at 216) the modified second request to any UE recipients identified in the original second request. UE 113 and the UE recipients may then establish the second session using the first codec and/or other parameters specified in the second request response and/or modified second request.

In this manner, controller 101 may transition IP-based telephony and/or other voice services that UEs access via first RAN 103 from the higher bitrate and lower rate of compression of the first codec (e.g., AMR-WB) to the lower bitrate and higher compression of the second codec (e.g., EVS) to improve capacity at first RAN 103, where differences in call quality may be imperceptible to a user between the use of the lower bitrate and higher compression of the second codec and the higher bitrate and lower compression of the first codec. MRF 107 may transcode, translate, convert, and/or perform other functions to allow UEs, that access services via first RAN 103 and that use the second codec, to participate on the same call, conference, session, and/or other service as UEs that use the first codec or a codec that is different than the second codec (e.g., a codec other than the second codec).

Figure 3:
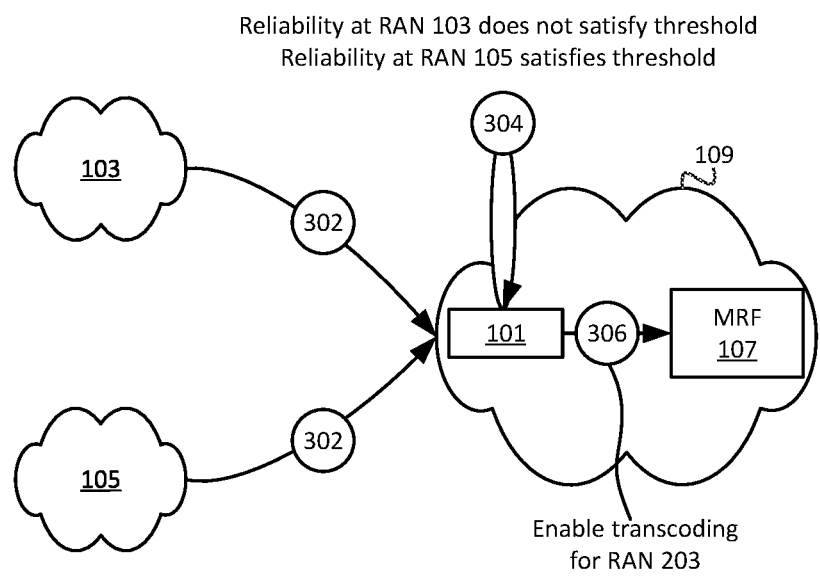
FIG. 3 illustrates an example of selectively enabling different audio codecs to improve service reliability and/or quality at a RAN based on detecting one or more events at the RAN, in accordance with some embodiments presented herein.

FIG. 3 illustrates an example of controller 101 selectively provisioning different codecs and dynamically allocating transcoding resources to improve service reliability and/or quality in response to the occurrence of performance-related events at a RAN in accordance with some embodiments presented herein. As shown in FIG. 3, controller 101 may monitor (at 302) service reliability and/or quality metrics at first RAN 103 and second RAN 105. For instance, controller 101 may retrieve the number of drop calls, packet loss, key performance indicators ("KPIs"), and/or other data for voice and/or data services that are accessed via first RAN 103 and second RAN 105 during a first period of time in which UEs that are connected to first RAN 103, second RAN 105, and/or other RANs, are permitted to use a first audio codec (e.g., AMR-WB codec) in order to access IP-based telephony and/or other voice services.

Controller 101 may determine (at 304) that network reliability at first RAN 103 does not satisfy reliability-based performance criteria, and that network reliability at second RAN 105 satisfies the reliability-based performance criteria. The network reliability at RANs 103 and 105 and/or the reliability-based criteria may be based on a quantity of dropped calls, packet error and/or loss rate, jitter, and/or other suitable performance or QoS-related metrics associated with telephony and/or voice services occurring at a RAN during the first period of time. For instance, the network reliability at first RAN 103 may not satisfy the performance criteria when the percentage or count of calls that are dropped reaches a specified value. Similarly, the network reliability at second RAN 105 may satisfy the performance criteria when the average throughput, bitrate, and/or packet loss for a set of UEs accessing voice services via second RAN 105 provide an acceptable level of service as quantified by throughput, bitrate, and/or packet loss thresholds. The information may be received from UEs participating in telephony and/or voice services, base stations of RANs 103 and 105, application servers that participate in such services, and/or one or more other suitable sources.

Transitioning the services from the first codec to a second codec (e.g., EVS codec) may improve reliability and/or quality by improving jitter, latency, and/or other performance metrics by virtue of characteristics of the first codec relative to the second codec. For example, as discussed above, the first codec may use JBM and/or other suitable features to reduce the impact of variable transmission times and latency, perform error concealment to mask over any missed packets even if the connection temporarily slows down or drops, and/or may include other features to account for or negate the detected performance issues. Accordingly, controller 101 may selectively enable (at 306) the second codec to improve the reliability and quality of voice calls and/or other IP-based telephony services for UEs accessing those services when connected to first RAN 103.

As similarly described above, the selective enablement of the second codec may be performed by controller 101. In particular, controller 101 may forward to MRF 107 original requests that may include an indication of the first codec and/or the second codec and that originate from UEs connected to first RAN 103 (e.g., UE 109), while forwarding to MRF 107 modified requests that remove the indication of the second codec from requests originated by UEs connected to RAN 105 (e.g., ULE 113).

Figure 4:
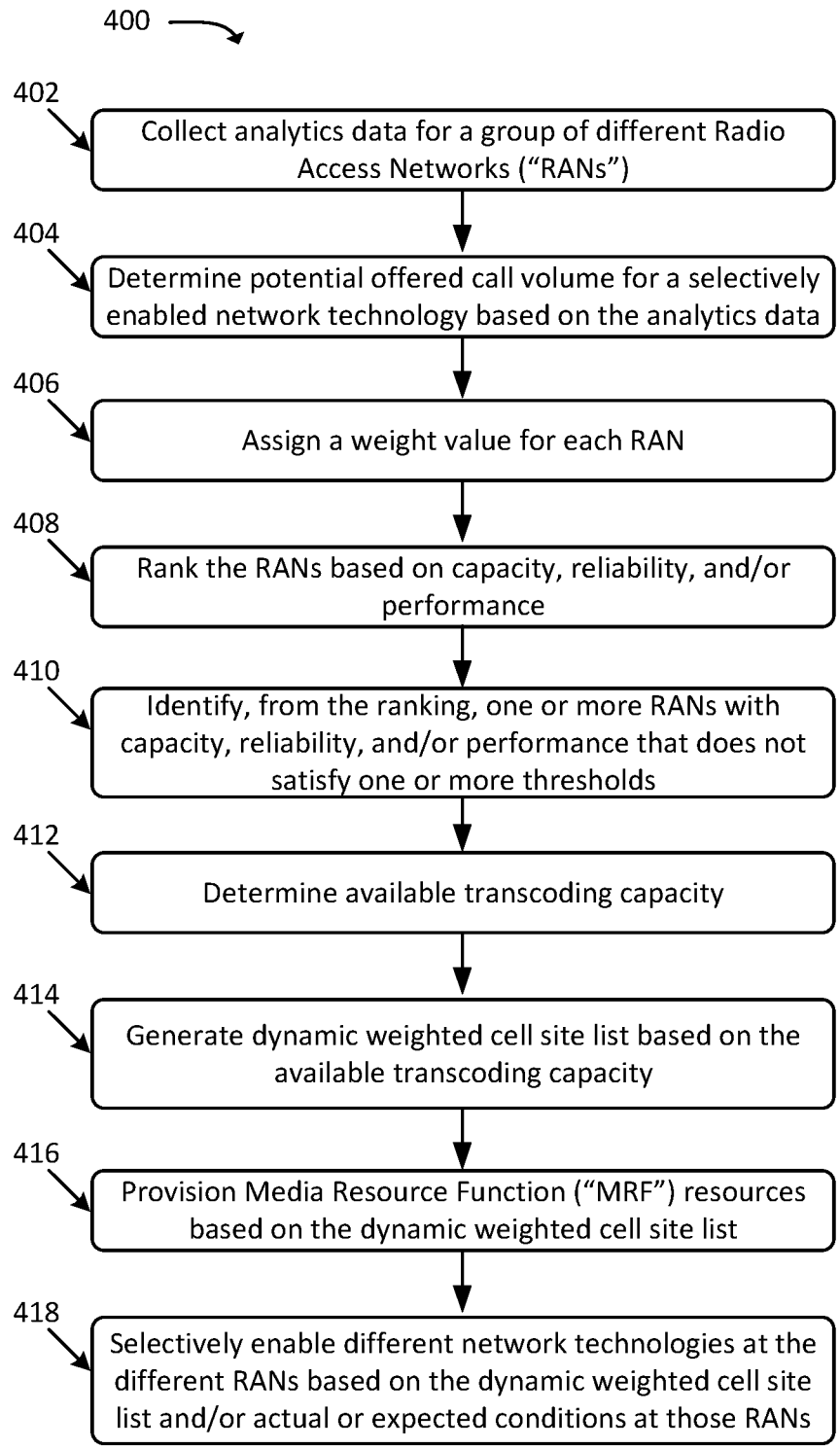
FIG. 4 presents a process for selectively enabling different audio codecs in accordance with some embodiments presented herein.

FIG. 4 presents a process 400 for selectively enabling different codecs in accordance with some embodiments presented herein. Process 400 may be implemented by controller 101.

Process 400 may include collecting (at 402) analytics data for a group of different RANs. The analytics data may include cell site/sector performance data and/or voice service utilization data over time, such as the number of dropped calls at a base station or cell site, packet loss and/or error rate, KPIs, call volume, spectrum availability and/or consumption (e.g., used and/or available Physical Resource Blocks ("PRBs")), and/or other data for IP-based telephony and/or voice services. Controller 101 may collect (at 402) the analytics data from an element management system ("EMS"), MRF 107, Packet Data Network Gateway ("PGW"), gNBs, eNBs, a Network Exposure Function ("NEF"), a Service Capability Exposure Function ("SCEF"), and/or other components or databases of the core network or the IMS.

Process 400 may include determining (at 404) the potential offered EVS call volume or call volume for a selectively enabled first codec based on the analytics data for calls established using a different second codec. Determining (at 404) the potential offered call volume for the selectively enabled first codec may include determining the expected volume of calls to transcode between the selectively enabled first codec and other codecs. In some embodiments, controller 101 may collect Session Initiation Protocol ("SIP") messages by which UEs establish voice calls. In those messages, UEs may identify which codecs they support. Accordingly, controller 101 may inspect the messages to determine the number or percentage of UEs that support the selectively enabled first codec. In some embodiments, controller 101 may determine (at 404) the potential offered EVS call volume by inspecting PGW AMR-WB total busy-hour-call-attempts ("BHCA") call volume data within the collected analytics data. The PGW AMR-WB BHCA data may include numbers and endpoints for transcoded and non-transcoded AMR-WB calls. Controller 101 may filter the PGW AMR-WB BHCA data by different PGW identifiers ("PGWIDs"), and may determine the ratio of transcoded and non-transcoded calls regionally. The ratio of transcoded calls to non-transcoded calls with an endpoint at a particular RAN provides an indication of EVS call volume for that particular RAN.

Process 400 may include assigning (at 406) a weight value for each RAN based on KPIs and call volume. In some embodiments, controller 101 may assign (at 406) a greater weight value to the subset of RANs that experience higher call volume and/or that exhibit relatively lower levels of performance (e.g., greater packet loss, more dropped calls, higher latency, more jitter, greater number of scheduling delays, path loss, etc.) via the KPIs. In other words, controller 101 may assign (at 406) a greater weight value to the subset of RANs that may realize a greater benefit from selective enablement of the first audio codec. In some embodiments, the weight value for a particular RAN may be based on the ratio of transcoded and non-transcoded calls that have an endpoint at the particular RAN. For example, controller 101 may determine that 20% of calls with an endpoint at the particular RAN may be transcoded, and may assign (at 406) a 1.2 weight value to the particular RAN.

Process 400 may include ranking (at 408) the RANs based on capacity, reliability, and/or performance. In some embodiments, the ranking (at 408) may be determined according to the potential offered EVS call volume and the RAN weighting. For example, the ranking may indicate, in a prioritized or ranked manner, RANs that have the lowest available capacity, reliability, and/or performance, and/or that have the highest ratio of UEs supporting the selectively enabled first codec. The list may identify the RANs based on their cell identifier or Cell ID ("CID"), sector identifier, or another unique identifier.

Process 400 may include identifying (at 410), based on the ranking, one or more RANs with capacity, reliability, and/or performance that do not satisfy corresponding capacity, reliability, and/or performance criteria. Different criteria may be set for different RANs based on available capacity, different levels of reliability, and/or different levels of performance that are acceptable at different RANs.

Process 400 may include determining (at 412) the available transcoding capacity. The transcoding capacity may be based on the number of MRFs 107 and/or MRF resources (e.g., processor, memory, bandwidth, etc.). For instance, controller 101 may obtain MRF 107 load for different times of day and days of the week, and may determine the maximum number of transcoded sessions that each MRF 107 can support.

In some embodiments, controller 101 may determine (at 412) the available transcoding capacity for different regions, Open Shortest Path First ("OSPF") areas, or other subdivisions of the network based on the location or deployment of MRFs 107 (e.g., transcoding resources) to those regions. For instance, a first set of MRFs 107 may be geographically proximate to a first set of RANs, and a second set of MRFs 107 may be geographically proximate to a different second set of RANs. The first set of MRFs 107 may therefore transcode calls terminating at the first set of RANs with less latency than the second set of MRFs 107.

Process 400 may include generating (at 414) a dynamic weighted cell site list based on the available transcoding capacity. The dynamic weighted cell site list may specify different criteria or triggers at which controller 101 selectively enables different codecs at different RANs where the capacity, reliability, and/or performance does not satisfy the one or more criteria, and different numbers of calls or sessions that are permitted to use the different audio codecs.

For instance, the criteria or triggers may enable transcoding for IP-based telephony and/or voice services that are accessed via first RAN 103 upon call volume at first RAN 103 reaching a first value, and may enable transcoding for IP-based telephony and/or voice services that are accessed via second RAN 105 upon call volume second RAN 105 reaching a different second value based on controller 101 determining that first RAN 103 experiences heavier call volumes than second RAN 105, and that first RAN 103 may run out of capacity sooner than second RAN 105 as a result.

Process 400 may include dynamically provisioning (at 416) MRF 107 resources based on the dynamic weighted cell site list. Dynamically provisioning (at 416) the MRF 107 resources may include allocating and/or configuring different sets of MRFs 107 for transcoding calls originating within different sets of RANs. For instance, if call volume at a set of RANs, that experience capacity and/or reliability issues, is high, then controller 101 may allocate transcoding resources of MRF 107 to a smaller number of the set of RANs, whereas if call volume at the ranked set of RANs is low, then controller 101 may allocate transcoding resources of MRF 107 to a greater number of the set of RANs.

In some embodiments, each MRF 107 may include a software defined network ("SDN") component, and dynamically provisioning (at 416) the MRF 107 resources may include deploying MRF 107 images to hardware that is geographically proximate to a set of RANs. For instance, controller 101 may deploy an MRF 107 to resources at a network edge or at a Multi-Access Edge Computing ("MEC") site of the network that is proximate to one or more RANs in the dynamic weighted cell site list. The provisioning (at 416) may also be based on the available resources that can be configured as an executable instance of MRF 107.

Process 400 may include selectively enabling (at 418) the different codecs at the different RANs based on the dynamic weighted cell site list and/or actual or expected conditions at those RANs. In some embodiments, selectively enabling (at 418) a particular codec for use by UEs that are connected to a particular RAN may include adding the CID or other unique identifier for the particular RAN to the cell site list of one or more provisioned MRFs 107 that provide transcoding for the particular RAN and/or other RANs.

The conditions at the RANs and/or availability of MRFs 107 may continually change over time. For instance, the RANs may experience different call volume, and different numbers of resources may be configured as MRF 107 at different times. Accordingly, controller 101 may periodically perform process 400 in order to update RAN state, the provisioning of MRF 107 resources based on RAN state, and/or the selective enablement of the different codecs to shift the improvements to capacity, reliability, and/or performance provided by the enabled codecs to RANs with insufficient capacity, poor reliability, and/or poor performance.

Figure 5:
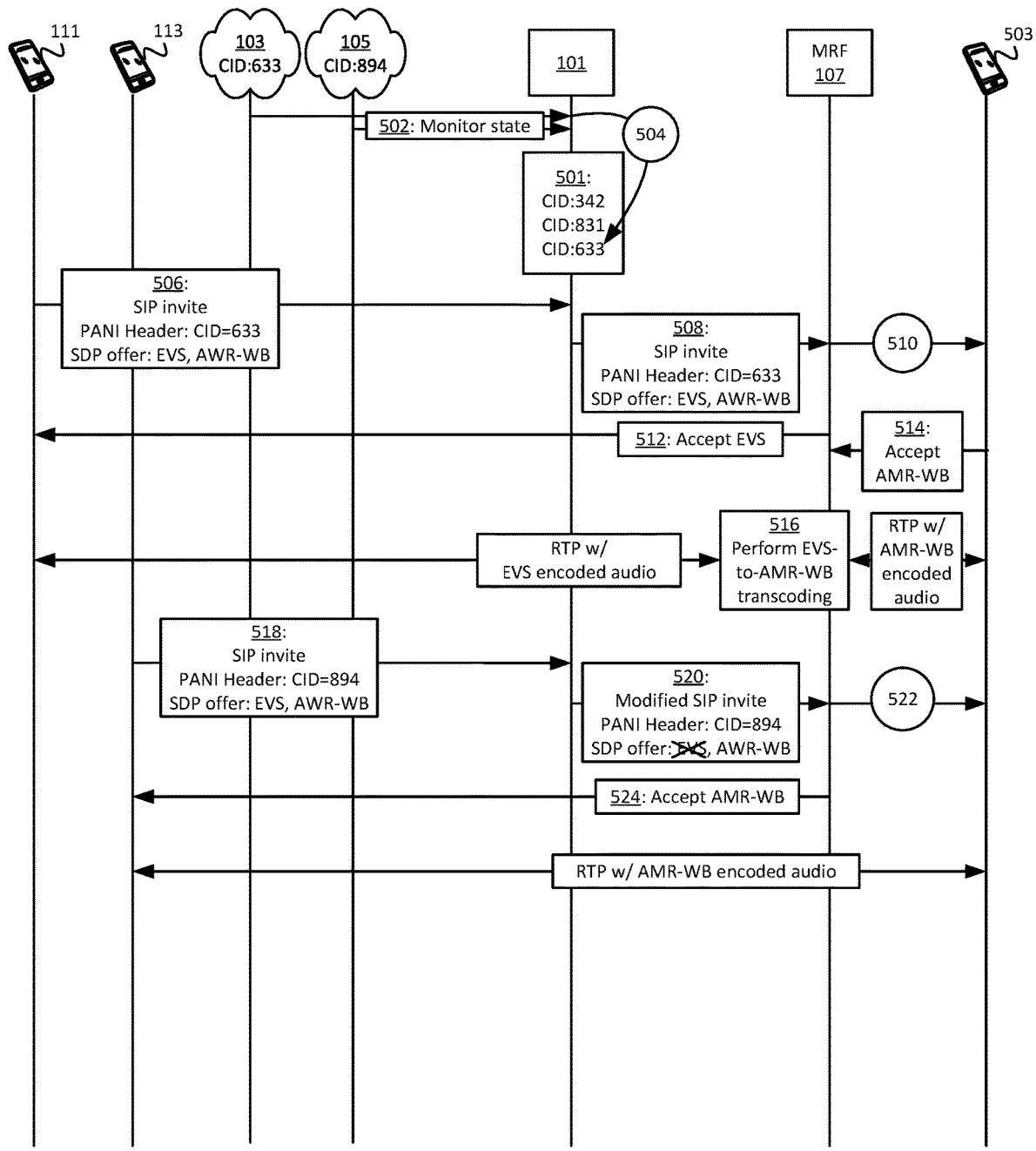
FIG. 5 illustrates an example message diagram for selectively enabling Enhanced Voice Services ("EVS") in accordance with some embodiments presented herein.

FIG. 5 illustrates an example message diagram for selectively enabling EVS in accordance with some embodiments presented herein. FIG. 5 may include messaging exchanged between controller 101, MRF 107, first UE 111 that is connected to and accesses network services via first RAN 103, and/or second UE 113 that is connected to and accesses network services via second RAN 105.

Controller 101 may monitor (at 502) the state of first RAN 103 and second RAN 105, may selectively enable EVS for use by UEs accessing services from a first set of RANs, that includes first RAN 103 and excludes second RAN 105, because of QoS metrics, like jitter, error rate, number of dropped calls, etc. and/or load metrics, like congestion, available capacity, etc. Controller 101 may selectively enable EVS for use by UEs connected to first RAN 103 by adding (at 504) the CID of first RAN 103 to cell site list 501 or an internal configuration.

As shown in FIG. 5, first UE 111 may issue (at 506) a SIP Invite message in order to initiate a VoLTE voice call, a VoNR voice call, or other IP-based telephony service. First UE 111 may include the CID of first RAN 103 in the P-Access-Network-Info ("PANI") header of the SIP Invite message, and supported or preferred codecs to use for the call in a Session Description Protocol ("SDP") component of the message. For instance, the SDP component may identify EVS and AMR-WB as supported codecs for the call. The SDP component may include "rtpmap:" attributes that identify each codec.

Controller 101 may receive the SIP Invite message before processing by MRF 107 or the UE of the call recipient. Controller 101 may determine that first UE 111 supports EVS by inclusion of an identifier for the codec in the SDP component of the message, and that the CID in the message, that identifies the site from which the call request originates, is within cell site list 501. Accordingly, the call is being initiated from a site where EVS transcoding is offered (e.g., has been selectively enabled by controller 101). In some embodiments, controller 101 may determine from the monitored RAN state that the QoS-related metrics and/or load-based metrics at first RAN 103 may not provide an acceptable level of service, and may selectively enable EVS, based on the determination that the RAN state does not meet certain criteria, for voice calls originating from first RAN 103 in order to improve the QoS and/or capacity. In particular, controller 101 may selectively enable EVS in response to determining that the QoS-related metrics and/or load-based metrics at first RAN 103 may provide performance that has degraded below a preconfigured performance threshold and/or service with a larger than acceptable amount of dropped call, packet loss, etc. for some specified number of UEs.

Controller 101 may forward (at 508) the message to MRF 107, and/or may provide a message based on the SIP Invite message from UE 111 to MRF 107. As discussed above, the message (provided at 508) may not include a modification of the SDP offer in the SIP Invite message (e.g., may indicate the same list of codecs included in the SIP Invite message from UE 111). MRF 107 may create an entry with a destination identifier for recipient 503 of the call (e.g., which may be indicated in the SIP Invite message). The destination identifier may include a telephone number, IP address, SIP address and/or other value by which to contact call recipient 503. For instance, MRF 107 may generate a lookup on the called number via an enum query.

MRF 107 may provide (at 510) a message, that includes the unmodified codec list and/or SFD offer from UE 111, to call recipient 503, indicating that a call has been placed to call recipient 503. MRF 107 may also provide (at 512) a response to first UE 111 accepting use of the EVS codec.

Controller 101 and/or MRF 107 may monitor the response to the call request from call recipient 503. The response from call recipient 503 may include the call recipient identifier and a selection of one of the offered codecs that is supported by call recipient 503.

Upon receiving the response from call recipient 503, controller 101 and/or MRF 107 may determine that the response is for the call being initiated by first UE 111 based on the created entry and the response having the same identifier of the call recipient. Should the response provided by call recipient 503 identify EVS, a transcoding pass-through option of MRF 107 may be triggered such that the data packets for the call are passed through MRF 107 without being assigned transcoding resources and/or without being transcoded. In some embodiments, controller 101 may set MRF 107 to the pass-through mode or MRF 107 may directly enter the pass-through mode.

In this example, the response from call recipient 503 indicates (at 514) a codec other than EVS (e.g., AMR-WB) for the call. Consequently, controller 101 may allocate transcoding resources of MRF 107 to the call, and/or MRF 107 may transcode (at 516) between the different codecs being used by the different UEs on the call. In particular, once the call is established between first UE 111 and call recipient 503, first UE 111 and call recipient 503 may exchange Real-Time Transport Protocol ("RTP") messages or messages of other protocols that include audio encoded with the different codecs, and MRF 107 may transcode (at 516) between the different codecs so that the UEs at either end of the call may seamlessly communicate despite using different codecs.

Also shown in FIG. 5, second UE 113 may issue (at 518) a SIP Invite message in order to initiate a VoLTE voice call, a VoNR voice call, or another IP-based telephony service. Second UE 113 may include the CID of second RAN 105 in the PANI header of the SIP Invite message, and EVS and AMR-WB as supported or preferred codecs to use for the call in the SDP component of the message.

Controller 101 may receive the SIP Invite message from second UE 113, may determine that second UE 113 supports EVS by inclusion of an identifier for the codec in the SDP component of the message, and may further determine that the CID in the message, that identifies the site from which the call request originates, is not within cell site list 501. In other words, the call is being initiated from a site where EVS transcoding is not offered.

To prevent transcoding resources from being allocated to the call that is initiated by second UE 113 and that originates from second RAN 105, controller 101 may modify the SIP Invite message. In some embodiments, controller 101 may modify the PANI header of the SIP Invite message to remove the EVS codec SDP offer, and may provide (at 520) the modified SIP Invite message to MRF 107, or may provide a message based on the SIP Invite message from UE 113 that does not identify EVS as a supported codec.

MRF 107 determines that no EVS-to-AMR-WB transcoding resources are required for the call being initiated by second UE 113 due to the removal and/or omission of EVS from the modified SIP Invite message, and may forward (at 522) the modified SIP Invite message to call recipient 503, thereby providing call recipient 503 a message that identifies AMR-WB as the sole codec with which to engage in the call. MRF 107 may also provide (at 524) a response to second UE 113 to accept use of the AMR-WB codec. In this manner, controller 101 may cause second UE 113 and call recipient 503 to establish the call using the same codec, thereby preventing an allocation of transcoding resources to second UE 113 and/or second RAN 105, and/or disabling use of EVS by UEs accessing services from second RAN 105.

In some embodiments, controller 101 may use artificial intelligence and/or machine learning to generate predictive models for preemptive enabling of the transcoding and/or other interoperability functions of MRF 107 for different RANs prior to the RANs experiencing capacity shortages, reliability problems, lower levels of performance, and/or other service degradation. In some such embodiments, controller 101 may track capacity, performance-related metrics, and/or QoS-related metrics over time at the different RANs, and may apply the artificial intelligence and/or machine learning to detect repeating patterns in the capacity, reliability, and/or performance at each RAN. In particular, the artificial intelligence and/or machine learning may correlate service degradation at a particular RAN to recurring events based on time and location of the events. Controller 101 may reference the repeating patterns and/or event correlation within the predictive models to anticipate the potential for future service degradation at various RANs, and may improve service at one or more RANs before the service degradation occurs via the selective enablement of the different codecs.

Figure 6:
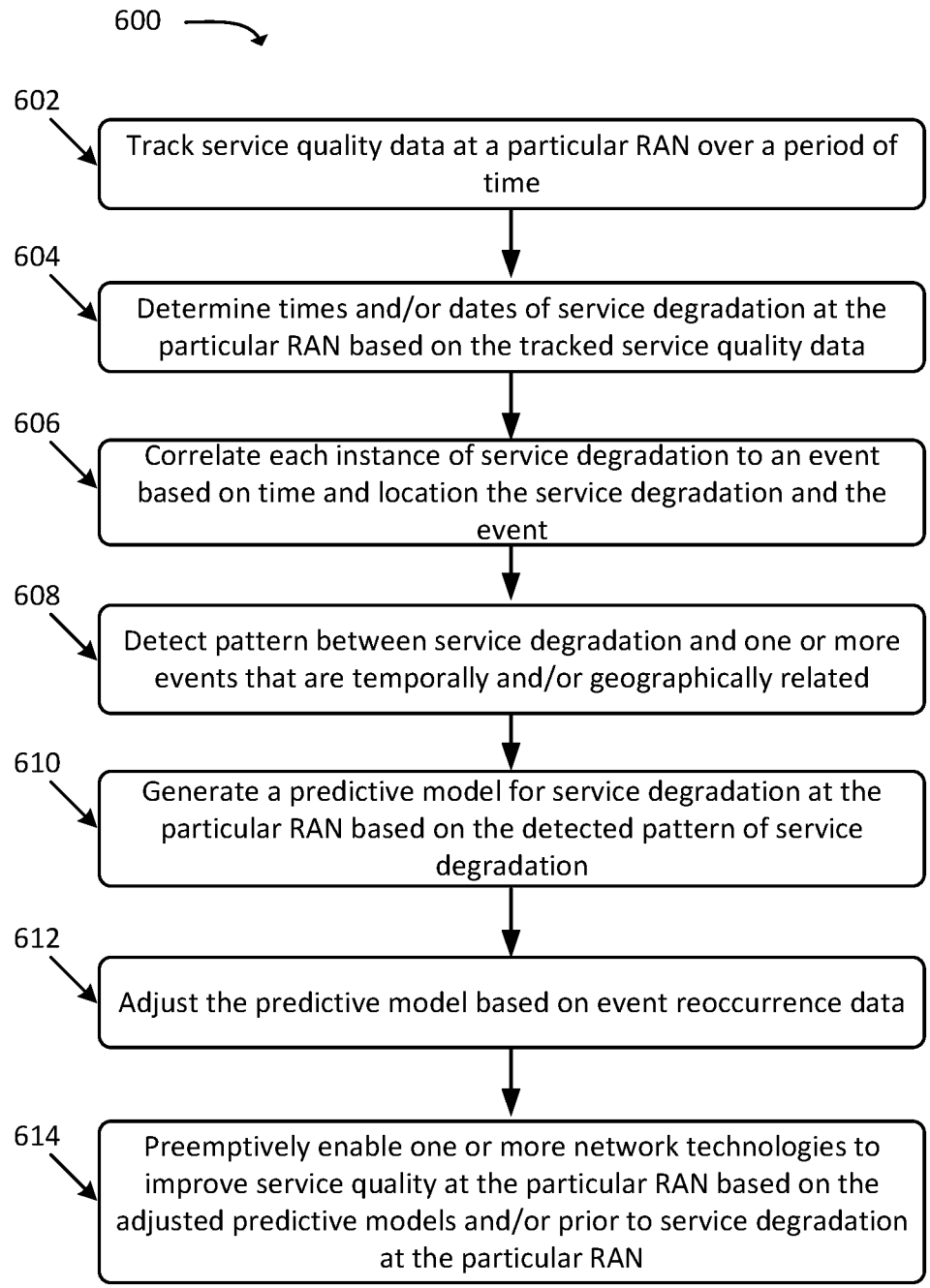
FIG. 6 presents a process for preemptively enabling different audio codecs at a particular RAN based on a predictive model in accordance with some embodiments presented herein.

FIG. 6 presents a process 600 for preemptively enabling different codecs at a particular RAN based on a predictive model in accordance with some embodiments presented herein. Process 600 may be implemented by controller 101.

Process 600 may include tracking (at 602) capacity, performance-related metrics, QoS-related metrics, and/or other service quality data at the particular RAN over a period of time. For instance, controller 101 may obtain KPIs for the particular RAN for a one-month period, for the same month over the past three years, etc.

Process 600 may include determining (at 604) times and/or dates of service degradation at a particular RAN based on the tracked service quality data. In some embodiments, determining (at 604) times and/or dates of service degradation may include detecting when reliability and/or capacity at the particular RAN did not satisfy one or more performance criteria. For instance, controller 101 may detect times at which call volume, packet loss, and/or the number of dropped calls at the particular RAN exceeded a threshold amount. Controller 101 may record each instance of service degradation.

Process 600 may include correlating (at 606) each instance of service degradation to an event based on time and location of the service degradation and event. The location for each instance of service degradation may be linked to the service area or location of the RAN experiencing the service degradation.

Controller 101 may retrieve event data from external data sources such as the Internet. Controller 101 may perform queries for events that occurred at or around a particular time and location when service at a particular RAN was degraded. For instance, controller 101 may identify weather events, live events (e.g., sporting events, concerts, shows, conventions, etc.), news events, and/or other events that may impact call volume, signaling, and/or other QoS-related or performance-related characteristics at the particular RAN. More specifically, controller 101 may identify events that create surges in call volume at one or more RANs and/or cause RF interference which may lead to increased packet loss poor reliability, or other service degradation.

Process 600 may include detecting (at 608) a pattern between service degradation at the particular RAN and one or more events that are temporally and/or geographically related. In some embodiments, controller 101 may use artificial intelligence and/or machine learning to detect (at 608) recurring patterns when the same or similar service degradation occurs at or around the same time of a correlated event (e.g., the event occurring up to one hour before the service degradation).

For instance, as part of tracking (at 602) the service quality data, controller 101 may detect a service degradation at a particular RAN, and may tag that service degradation with all available or trending event information. Controller 101 may analyze the tags, and via the artificial intelligence and/or machine learning, may detect recurring events that are causes for different service degradations. For instance, controller 101 may determine that service quality at a particular RAN does not satisfy a threshold 75% of the time when a severe weather warning is issued where the particular RAN is located. Similarly, controller 101 may determine that call volume increases and available capacity decreases past a threshold 80% of the time when a nearby venue hosts an event.

In some embodiments, the artificial intelligence and/or machine learning may detect (at 608) recurring patterns of service degradation that are unrelated to specific events. In some such embodiments, the recurring patterns of service degradation may include service degradation that is temporally linked. For instance, capacity at the particular RAN may fall below capacity-based performance criteria every weekday between 4 and 6 PM, or service quality at the particular RAN may not satisfy quality-based performance criteria at least 10 times during a specific two-week period in January due to severe weather.

Process 600 may include generating (at 610) a predictive model for service degradation at the particular RAN based on the detected pattern of service degradation. The predictive model may provide expected times and/or days at which a particular service degradation or different service degradations are expected to occur at the particular RAN, and may provide a score for each such prediction. The score may indicate a degree of certainty for each prediction, and the score may be based on the past regularity of each service degradation or the degree to which capacity, reliability, and/or performance at the particular RAN is impacted.

Process 600 may include adjusting (at 612) the predictive model based on event reoccurrence data from external sources. The event reoccurrence data may include event forecasts, schedules, and/or demand. For instance, controller 101 may adjust the predictive model based on weather forecasts for a region covered by the particular RAN, based on scheduled events taking place at or around the particular RAN, and/or based on anticipated demand for events that are scheduled to take place at or around different RANs. Controller 101 may calculate the anticipated event demand from trending keywords, search query results, website views, etc.

Process 600 may include preemptively enabling (at 614) one or more codecs to improve service quality at the particular RAN based on the adjusted predictive model, and/or prior to service degradation at the particular RAN. For instance, controller 101 may preemptively enable EVS at a first RAN ahead of a first period of time when the first RAN is expected to receive an increase in call volume, may disable EVS at the first RAN after the first period of time, and may preemptively enable EVS at a second RAN ahead of a second period of time when service quality at the second RAN is expected to degrade because of one or more events taking place during the second period of time.

Figure 7:
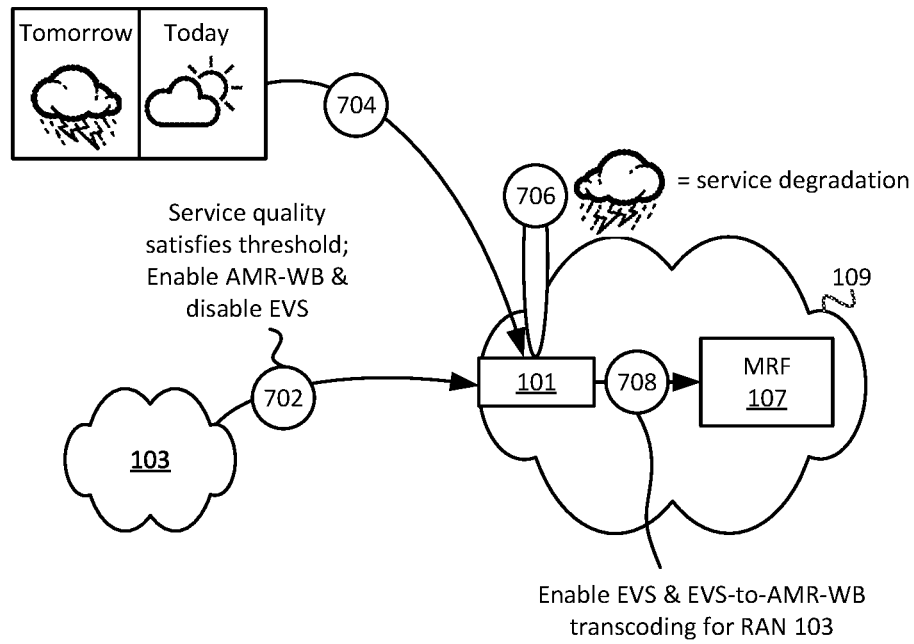
FIG. 7 illustrates an example of preemptively enabling an audio codec for use at a particular RAN based on a predictive model of service degradation in accordance with some embodiments presented herein.

FIG. 7 illustrates an example of controller 101 preemptively enabling a codec for use at a particular RAN based on a predictive model of service degradation in accordance with some embodiments presented herein. As shown in FIG. 7, controller 101 may monitor state of RAN 103, and may determine (at 702) that service quality at RAN 103 satisfies quality-based performance criteria. Controller 101 may ordinarily allow UEs to access services from RAN 103 using an existing first codec, and may disable use of a second codec for services accessed from RAN 103 in order to preserve transcoding resources of MRF 107 that would be otherwise be required for interoperability between UEs using the first codec and UEs using the second codec.

However, controller 101 may also query an external weather forecasting service for weather at or around RAN 103, and may receive (at 704) a weather forecast that includes a severe weather warning (e.g., a snowstorm) for the following day at or around RAN 103. Controller 101 may use artificial intelligence and/or machine learning to determine (at 706) a correlation and/or causation between past severe weather events and service degradation at RAN 103. For instance, the severe weather event may create RF interference. The RF interference may result in increased packet loss, increased dropped calls, and/or other service degradation at RAN 103. The artificial intelligence and/or machine learning may link the timing and location of past severe weather events to multiple past instances in which the service quality at RAN 103 did not satisfy the quality-based performance criteria.

Accordingly, controller 101 may predict that RAN 103 will be adversely impacted by the severe weather event, and may take preemptive action to improve service for UEs connected to RAN 103. The preemptive action may include controller 101 selectively enabling (at 708) use of the second codec, in addition to or instead of the first codec, that UEs may use to access services from RAN 103, wherein the second codec may feature better error correction, error concealment, and/or other recovery mechanisms to provide better reliability than the first codec when there is increased RF interference. For instance, controller 101 may add the CID for RAN 103 to cell site list 501 the day of or one or more hours before the severe weather event is expected to reach the geographic region covered by RAN 103. The second codec may therefore mitigate some of the reliability issues caused by the severe weather event. Once the severe weather event has passed, controller 101 may disable use of the second codec by UEs accessing services from RAN 103 in order to reallocate the transcoding resources to other RANs that may be affected by the passing of the severe weather event or other events causing service degradation.

Figure 8:
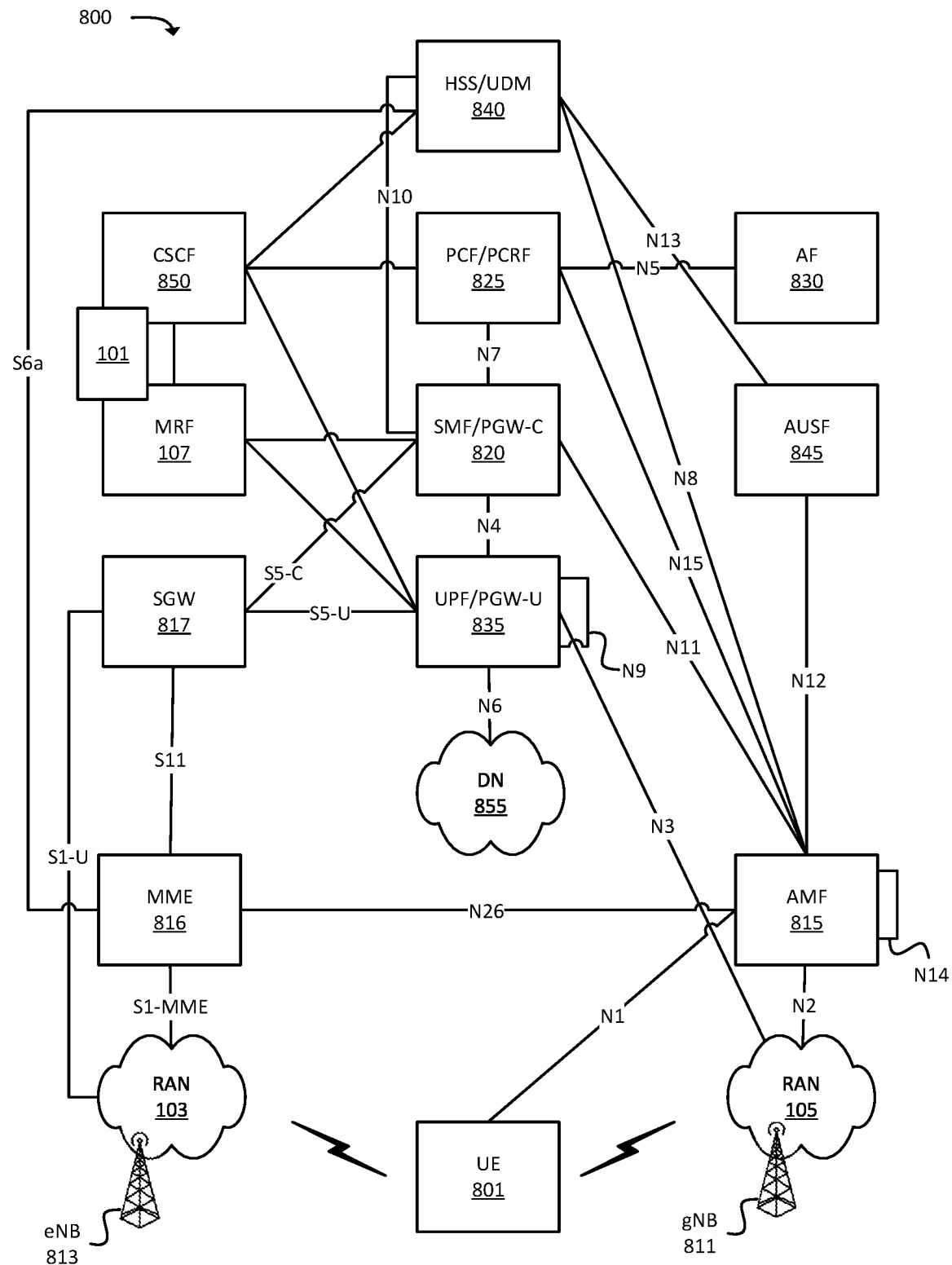
FIG. 8 illustrates an example environment, in which one or more embodiments may be implemented.

FIG. 8 illustrates an example environment 800, in which one or more embodiments may be implemented. In some embodiments, environment 800 may correspond to a Fifth Generation ("5G") network, and/or may include elements of a 5G network. In some embodiments, environment 800 may correspond to a 5G Non-Standalone ("NSA") architecture, in which a 5G radio access technology ("RAT") may be used in conjunction with one or more other RATs (e.g., an LTE audio RAT), and/or in which elements of a 5G core network may be implemented by, may be communicatively coupled with, and/or may include elements of another type of core network (e.g., an Evolved Packet Core ("EPC")). As shown, environment 800 may include UE 801, RAN 103 (which may include one or more gNBs 811), RAN 105 (which may include one or more eNBs 813), and various network functions such as AMF 815, Mobility Management Entity ("MME") 816, Serving Gateway ("SGW") 817, Session Management Function ("SMF")/PGW-Control plane function ("PGW-C") 820, Policy Control Function ("PCF")/Policy Charging and Rules Function ("PCRF") 825, Application Function ("AF") 830, User Plane Function ("UPF")/PGW-User plane function ("PGW-U") 835, Home Subscriber Server ("HSS")/Unified Data Management ("UDM") 840, Authentication Server Function ("AUSF") 845, Call Session Control Function ("CSCF") 850, MRF 107, and Data Network ("DN") 855. Environment 800 may also include one or more networks, such as Data Network ("DN") 850.

The example shown in FIG. 8 illustrates one instance of each network component or function (e.g., one instance of SMF/PGW-C 820, PCF/PCRF 825, UPF/PGW-U 835, HSS/UDM 840, and/or 845). In practice, environment 800 may include multiple instances of such components or functions. For example, in some embodiments, environment 800 may include multiple "slices" of a core network, where each slice includes a discrete set of network functions (e.g., one slice may include a first instance of SMF/PGW-C 820, PCF/PCRF 825, UPF/PGW-U 835, HSS/UDM 840, and/or 845, while another slice may include a second instance of SMF/PGW-C 820, PCF/PCRF 825, UPF/PGW-U 835, HSS/UDM 840, and/or AUSF 845). The different slices may provide differentiated levels of service, such as service in accordance with different Quality of Service ("QoS") parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. Alternatively, or additionally, one or more of the devices of environment 800 may perform one or more network functions described as being performed by another one or more of the devices of environment 800. Devices of environment 800 may interconnect with each other and/or other devices via wired connections, wireless connections, or a combination of wired and wireless connections. In some implementations, one or more devices of environment 800 may be physically integrated in, and/or may be physically attached to, one or more other devices of environment 800.

UE 801 may include a computation and communication device, such as a wireless mobile communication device that is capable of communicating with RAN 103, RAN 105, and/or DN 855. UE 801 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 801 may send traffic to and/or receive traffic (e.g., user plane traffic) from DN 855 via RAN 103, RAN 105, and/or UPF/PGW-U 835.

RAN 103 may be, or may include, a 5G RAN that includes one or more base stations (e.g., one or more gNBs 811), via which UE 801 may communicate with one or more other elements of environment 800. UE 801 may communicate with RAN 103 via an air interface (e.g., as provided by gNB 811). For instance, RAN 103 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 103 may receive traffic intended for UE 801 (e.g., from UPF/PGW-U 835, AMF 815, and/or one or more other devices or networks) and may communicate the traffic to UE 801 via the air interface.

RAN 105 may be, or may include, a LTE RAN that includes one or more base stations (e.g., one or more eNBs 813), via which UE 801 may communicate with one or more other elements of environment 800. UE 801 may communicate with RAN 105 via an air interface (e.g., as provided by eNB 813). For instance, RAN 103 may receive traffic (e.g., voice call traffic, data traffic, messaging traffic, signaling traffic, etc.) from UE 801 via the air interface, and may communicate the traffic to UPF/PGW-U 835, and/or one or more other devices or networks. Similarly, RAN 103 may receive traffic intended for UE 801 (e.g., from UPF/PGW-U 835, SGW 817, and/or one or more other devices or networks) and may communicate the traffic to UE 801 via the air interface.

AMF 815 may include one or more devices, systems, Virtualized Network Functions ("VNFs"), etc., that perform operations to register UE 801 with the 5G network, to establish bearer channels associated with a session with UE 801, to hand off UE 801 from the 5G network to another network, to hand off UE 801 from the other network to the 5G network, manage mobility of UE 801 between RANs 103 and 105 and/or gNBs 811, and/or to perform other operations. In some embodiments, the 5G network may include multiple AMFs 815, which communicate with each other via the N14 interface (denoted in FIG. 8 by the line marked "N14" originating and terminating at AMF 815).

MME 816 may include one or more devices, systems, VNFs, etc., that perform operations to register UE 801 with the EPC, to establish bearer channels associated with a session with UE 801, to hand off UE 801 from the EPC to another network, to hand off UE 801 from another network to the EPC, manage mobility of UE 801 between RANs 812 and/or eNBs 813, and/or to perform other operations.

SGW 817 may include one or more devices, systems, VNFs, etc., that aggregate traffic received from one or more eNBs 813 and send the aggregated traffic to an external network or device via UPF/PGW-U 835. Additionally, SGW 817 may aggregate traffic received from one or more UPF/PGW-Us 835 and may send the aggregated traffic to one or more eNBs 813. SGW 817 may operate as an anchor for the user plane during inter-eNB handovers and as an anchor for mobility between different telecommunication networks or RANs (e.g., RANs 103 and 105).

SMF/PGW-C 820 may include one or more devices, systems, VNFs, etc., that gather, process, store, and/or provide information in a manner described herein. SMF/PGW-C 820 may, for example, facilitate in the establishment of communication sessions on behalf of UE 801. In some embodiments, the establishment of communications sessions may be performed in accordance with one or more policies provided by PCF/PCRF 825.

PCF/PCRF 825 may include one or more devices, systems, VNFs, etc., that aggregate information to and from the 5G network and/or other sources. PCF/PCRF 825 may receive information regarding policies and/or subscriptions from one or more sources, such as subscriber databases and/or from one or more users (such as, for example, an administrator associated with PCF/PCRF 825).

AF 830 may include one or more devices, systems, VNFs, etc., that receive, store, and/or provide information that may be used in determining parameters (e.g., quality of service parameters, charging parameters, or the like) for certain applications.

UPF/PGW-U 835 may include one or more devices, systems, VNFs, etc., that receive, store, and/or provide data (e.g., user plane data). For example, UPF/PGW-U 835 may receive user plane data (e.g., voice call traffic, data traffic, etc.), destined for UE 801, from DN 855, and may forward the user plane data toward ULE 801 (e.g., via RAN 103, SMF/PGW-C 820, and/or one or more other devices). In some embodiments, multiple UPFs 835 may be deployed (e.g., in different geographical locations), and the delivery of content to UE 801 may be coordinated via the N9 interface (e.g., as denoted in FIG. 8 by the line marked "N9" originating and terminating at UPF/PGW-U 835). Similarly, UPF/PGW-U 835 may receive traffic from UE 801 (e.g., via RAN 103, SMF/PGW-C 820, and/or one or more other devices), and may forward the traffic toward DN 855. In some embodiments, UPF/PGW-U 835 may communicate (e.g., via the N4 interface) with SMF/PGW-C 820, regarding user plane data processed by UPF/PGW-U 835.

HSS/UDM 840 and AUSF 845 may include one or more devices, systems, VNFs, etc., that manage, update, and/or store, in one or more memory devices associated with AUSF 845 and/or HSS/UDM 840, profile information associated with a subscriber. AUSF 845 and/or HSS/UDM 840 may perform authentication, authorization, and/or accounting operations associated with the subscriber and/or a communication session with UE 801.

DN 855 may include one or more wired and/or wireless networks. For example, DN 855 may include an IP-based Packet Data Network ("PDN"), a wide area network ("WAN") such as the Internet, a private enterprise network, and/or one or more other networks. UE 801 may communicate, through DN 855, with data servers, other UEs 801, and/or to other servers or applications that are coupled to DN 855. DN 855 may be connected to one or more other networks, such as a public switched telephone network ("PSTN"), a public land mobile network ("PLMN"), and/or another network. DN 855 may be connected to one or more devices, such as content providers, applications, web servers, and/or other devices, with which UE 801 may communicate.

CSCF 850 may include one or more devices, systems, VNFs, etc., that gather, process, search, store, and/or provide information in a manner described herein. CSCF 850 may process and/or route messages, calls, etc. to and/or from UE 801 via the EPC. For example, CSCF 850 may process messages or calls, received from an external network, that are destined for UE 801. In another example, CSCF 850 may process messages and/or calls, received from UE 801, that are destined for the external network. CSCF 850 may be part of an IMS network that includes multiple CSCFs 850 (e.g., geographically distributed CSCFs 850, which may be located in, or otherwise associated with, different data centers). A "data center" may include a physical facility, and/or may refer to a particular set of devices. In some embodiments, different data centers may be defined in terms of different ASNs or other identifiers used in a dynamic routing technique (e.g., BGP). While not explicitly shown in FIG. 8, the term "CSCF" may refer to a set of CSCFs, including an Interrogating CSCF ("I-CSCF"), a Serving CSCF ("S-CSCF"), and/or a Proxy CSCF ("P-CSCF").

MRF 107 may include one or more devices, systems, VNFs, etc., that provide media services and/or media manipulation like voice mixing, announcements, tones, and conferencing for VoLTE voice call, VoNR voice call, Wi-Fi calling, fixed VoIP solutions, and/or other IP-based telephony services. As noted above, MRF 107 may include an MRFC and an MRFP. The MRFC may receive and/or process SIP requests, and may manage media resources by interpreting the information coming from AF 830 and/or S-CSCF to control the MRFP. The MRFP may mix, transcode, translate, convert, source, and/or otherwise process media streams.

As shown in FIG. 8, controller 101 may operate as a standalone device, system, VNF, or other component of the core network or IMS, or may operate as part of one or more of CSCF 850 and MRF 107. When integrated as part of CSCF 850, controller 101 may selectively enable different audio codecs at different MRFs 107 deployed within the network. When integrated as part of a single MRF 107, controller 101 may perform a distributed function by selectively enabling different audio codecs for a subset of RANs that are serviced by the MRF 107 on which controller 101 executes. Controller 101 may obtain RAN state and/or other data from one or more of the components identified in FIG. 8.

Figure 9:
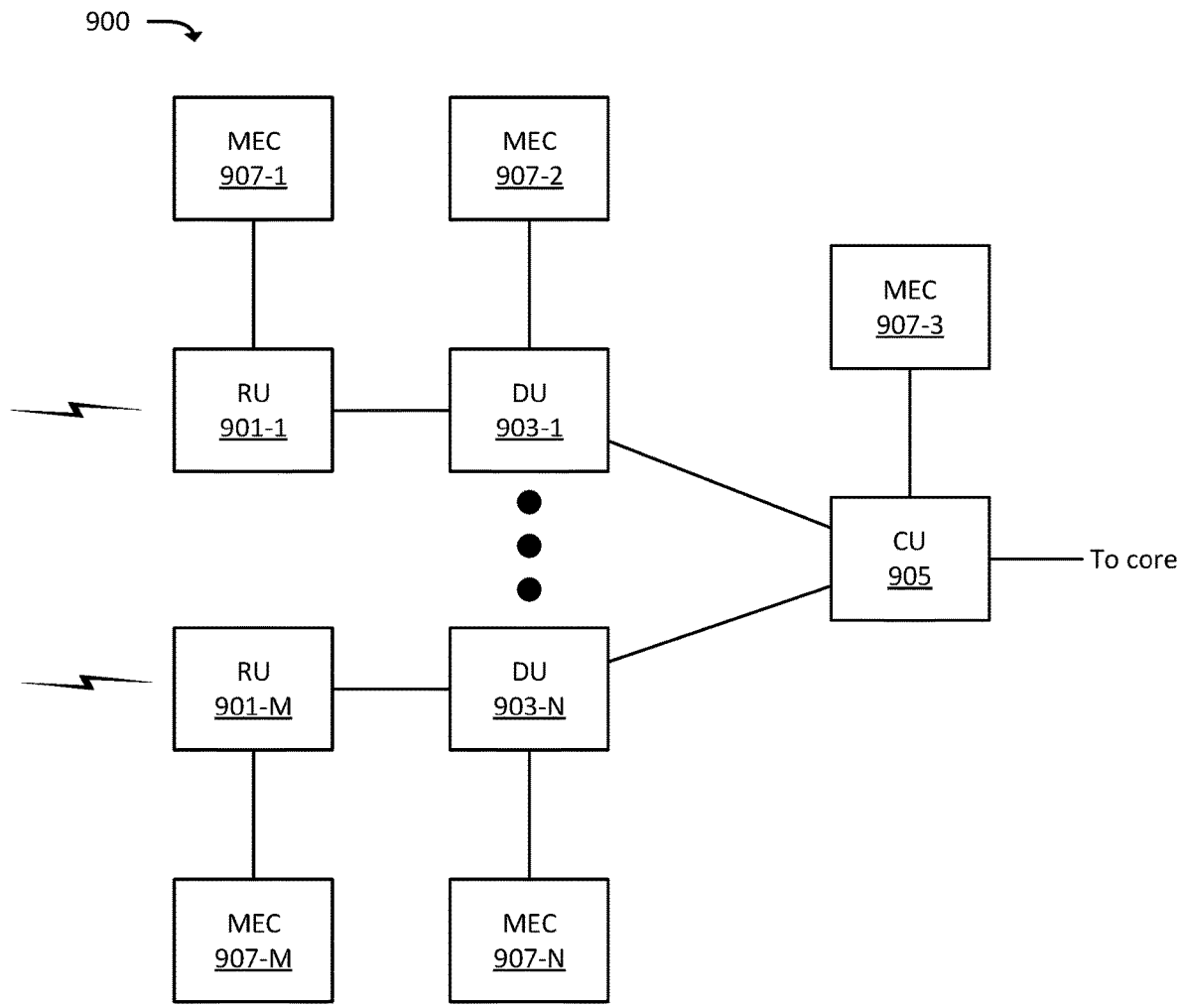
FIG. 9 illustrates an example arrangement of a RAN, in accordance with some embodiments.

FIG. 9 illustrates an example Distributed Unit ("DU") network 900, which may be included in and/or implemented by one or more RANs (e.g., RAN 103 or RAN 105). In some embodiments, a particular RAN may include one DU network 900. In some embodiments, a particular RAN may include multiple DU networks 900. In some embodiments, DU network 900 may correspond to a particular gNB 811 of a 5G RAN (e.g., RAN 103). In some embodiments, DU network 900 may correspond to multiple gNBs 811. In some embodiments, DU network 900 may correspond to one or more other types of base stations of one or more other types of RANs. As shown, DU network 900 may include Central Unit ("CU") 905, one or more Distributed Units ("DUs") 903-1 through 903-N (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 815 and/or UPF/PGW-U 835). In the uplink direction (e.g., for traffic from UEs 801 to a core network), CU 905 may aggregate traffic from DUs 903, and forward the aggregated traffic to the core network. In some embodiments, CU 905 may receive traffic according to a given protocol (e.g., Radio Link Control ("RLC")) from DUs 903, and may perform higher-layer processing (e.g., may aggregate/process RLC packets and generate Packet Data Convergence Protocol ("PDCP") packets based on the RLC packets) on the traffic received from DUs 903.

In accordance with some embodiments, CU 905 may receive downlink traffic (e.g., traffic from the core network) for a particular UE 801, and may determine which DU(s) 903 should receive the downlink traffic. DU 903 may include one or more devices that transmit traffic between a core network (e.g., via CU 905) and UE 801 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 801.

RU 901 may include hardware circuitry (e.g., one or more RF transceivers, antennas, radios, and/or other suitable hardware) to communicate wirelessly (e.g., via an RF interface) with one or more UEs 801, one or more other DUs 903 (e.g., via RUs 901 associated with DUs 903), and/or any other suitable type of device. In the uplink direction, RU 901 may receive traffic from UE 801 and/or another DU 903 via the RF interface and may provide the traffic to DU 903. In the downlink direction, RU 901 may receive traffic from DU 903, and may provide the traffic to UE 801 and/or another DU 903.

RUs 901 may, in some embodiments, be communicatively coupled to one or more Multi-Access/Mobile Edge Computing ("MEC") devices, referred to sometimes herein simply as ("MECs") 907. For example, RU 901-1 may be communicatively coupled to MEC 907-1, RU 901-M may be communicatively coupled to MEC 907-M, DU 903-1 may be communicatively coupled to MEC 907-2, DU 903-N may be communicatively coupled to MEC 907-N, CU 905 may be communicatively coupled to MEC 907-3, and so on. MECs 907 may include hardware resources (e.g., configurable or provisionable hardware resources) that may be configured to provide services and/or otherwise process traffic to and/or from UE 801, via a respective RU 901.

For example, RU 901-1 may route some traffic, from UE 801, to MEC 907-1 instead of to a core network (e.g., via DU 903 and CU 905). MEC 907-1 may process the traffic, perform one or more computations based on the received traffic, and may provide traffic to UE 801 via RU 901-1. In this manner, ultra-low latency services may be provided to UE 801, as traffic does not need to traverse DU 903, CU 905, and an intervening backhaul network between DU network 900 and the core network.

Figure 10:
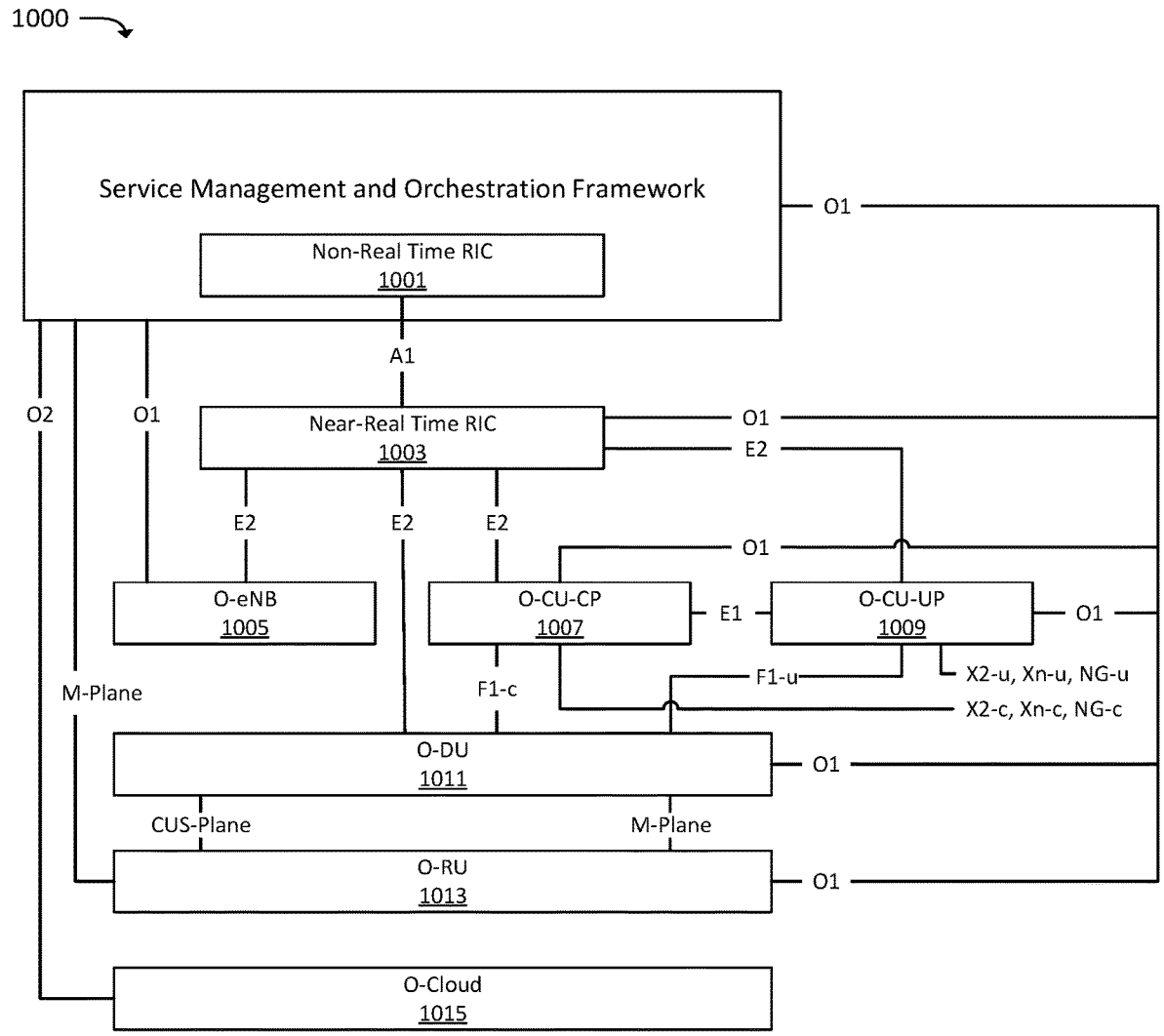
FIG. 10 illustrates an example arrangement of an Open RAN ("O-RAN") environment in which one or more embodiments, described herein, may be implemented.

FIG. 10 illustrates an example O-RAN environment 1000, which may correspond to RAN 103, RAN 105, and/or DU network 900. For example, RAN 103, RAN 105, and/or DU network 900 may include one or more instances of O-RAN environment 1000, and/or one or more instances of O-RAN environment 1000 may implement RAN 103, RAN 105, DU network 900, and/or some portion thereof. As shown, O-RAN environment 1000 may include Non-Real Time Radio Intelligent Controller ("RIC") 1001, Near-Real Time RIC 1003, O-eNB 1005, O-CU-Control Plane ("O-CU-CP") 1007, O-CU-User Plane ("O-CU-UP") 1009, O-DU 1011, O-RU 1013, and O-Cloud 1015. In some embodiments, O-RAN environment 1000 may include additional, fewer, different, and/or differently arranged components.

In some embodiments, some or all of the elements of O-RAN environment 1000 may be implemented by one or more configurable or provisionable resources, such as virtual machines, cloud computing systems, physical servers, and/or other types of configurable or provisionable resources. In some embodiments, some or all of O-RAN environment 1000 may be implemented by, and/or communicatively coupled to, one or more MECs 907.

Non-Real Time RIC 1001 and Near-Real Time RIC 1003 may receive performance information (and/or other types of information) from one or more sources, and may configure other elements of O-RAN environment 1000 based on such performance or other information. For example, Near-Real Time RIC 1003 may receive performance information, via one or more E2 interfaces, from O-eNB 1005, O-CU-CP 1007, and/or O-CU-UP 1009, and may modify parameters associated with O-eNB 1005, O-CU-CP 1007, and/or O-CU-UP 1009 based on such performance information. Similarly, Non-Real Time RIC 1001 may receive performance information associated with O-eNB 1005, O-CU-CP 1007, O-CU-UP 1009, and/or one or more other elements of O-RAN environment 1000 and may utilize machine learning and/or other higher level computing or processing to determine modifications to the configuration of O-eNB 1005, O-CU-CP 1007, O-CU-UP 1009, and/or other elements of O-RAN environment 1000. In some embodiments, Non-Real Time RIC 1001 may generate machine learning models based on performance information associated with O-RAN environment 1000 or other sources, and may provide such models to Near-Real Time RIC 1003 for implementation.

O-eNB 1005 may perform functions similar to those described above with respect to eNB 813. For example, O-eNB 1005 may facilitate wireless communications between UE 801 and a core network. O-CU-CP 1007 may perform control plane signaling to coordinate the aggregation and/or distribution of traffic via one or more DUs 903, which may include and/or be implemented by one or more O-DUs 1011, and O-CU-UP 1009 may perform the aggregation and/or distribution of traffic via such DUs 903 (e.g., O-DUs 1011). O-DU 1011 may be communicatively coupled to one or more RUs 901, which may include and/or may be implemented by one or more O-RUs 1013. In some embodiments, O-Cloud 1015 may include or be implemented by one or more MECs 907, which may provide services, and may be communicatively coupled, to O-CU-CP 1007, O-CU-UP 1009, O-DU 1011, and/or O-RU 1013 (e.g., via an O1 and/or O2 interface).

Figure 11:
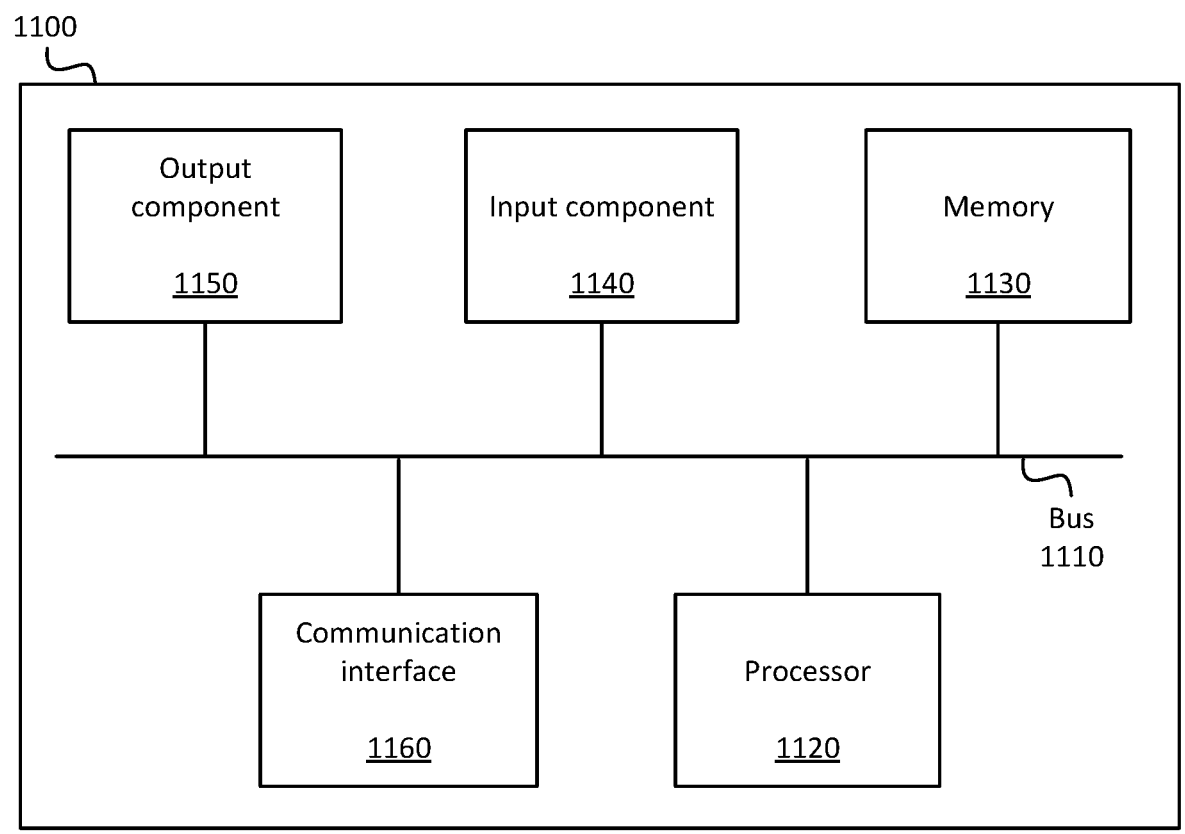
FIG. 11 illustrates example components of one or more devices, in accordance with one or more embodiments described herein.

FIG. 11 illustrates example components of device 1100. One or more of the devices described above (e.g., controller 101, MRF 107, etc.) may include one or more devices 1100. Device 1100 may include bus 1110, processor 1120, memory 1130, input component 1140, output component 1150, and communication interface 1160. In another implementation, device 1100 may include additional, fewer, different, or differently arranged components.

Bus 1110 may include one or more communication paths that permit communication among the components of device 1100. Processor 1120 may include a processor, microprocessor, or processing logic that may interpret and execute instructions. Memory 1130 may include any type of dynamic storage device that may store information and instructions for execution by processor 1120, and/or any type of non-volatile storage device that may store information for use by processor 1120.

Input component 1140 may include a mechanism that permits an operator to input information to device 1100, such as a keyboard, a keypad, a button, a switch, etc. Output component 1150 may include a mechanism that outputs information to the operator, such as a display, a speaker, one or more light emitting diodes ("LEDs"), etc.

Communication interface 1160 may include any transceiver-like mechanism that enables device 1100 to communicate with other devices and/or systems. For example, communication interface 1160 may include an Ethernet interface, an optical interface, a coaxial interface, or the like. Communication interface 1160 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 1100 may include more than one communication interface 1160. For instance, device 1100 may include an optical interface and an Ethernet interface.

Device 1100 may perform certain operations relating to one or more processes described above. Device 1100 may perform these operations in response to processor 1120 executing software instructions stored in a computer-readable medium, such as memory 1130. A computer-readable medium may be defined as a non-transitory memory device. A memory device may include space within a single physical memory device or spread across multiple physical memory devices. The software instructions may be read into memory 1130 from another computer-readable medium or from another device. The software instructions stored in memory 1130 may cause processor 1120 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
determine that quality of service at a particular Radio Access Network ("RAN") does not satisfy performance criteria during a first time period;
receive, during the first time period, a first request to establish a first session between a first User Equipment ("UE") and a second UE, the first request indicating a first codec and a second codec supported by the first UE;
add an identifier of the particular RAN to a list of RANs;
forward the first request with an indication of the first codec and the second codec to the second UE in response to determining that the quality of service at the particular RAN does not satisfy the performance criteria during the first time period, wherein forwarding the first request is in response to matching the identifier of the particular RAN from the first request to the identifier of the particular RAN in the list of RANs;
determine that the quality of service at the particular RAN satisfies the performance criteria during a second time period that is different from the first time period;
receive a second request to establish a second session between the first UE and the second UE during the second time period, the second request indicating the first and second codecs; and
disable availability of the second codec for the second session prior to establishing the second session by providing a modified request, that omits the second codec, in response to determining that the quality of service at the particular RAN satisfies the performance criteria during the second time period.

2. The device of claim 1, wherein the one or more processors are further configured to:
allocate resources to transcode between the first codec and the second codec for sessions originating from the particular RAN in response to determining that the quality of service at the particular RAN does not satisfy the performance criteria during the first time period.

3. The device of claim 1, wherein providing the modified request comprises:
issuing a Session Initiation Protocol ("SIP") message, instead of the second request, with an offer of the first codec and without an offer of the second codec to one or more of a Media Resource Function ("MRF") or the second UE.

4. The device of claim 1, wherein disabling the availability of the second codec comprises:
removing an offer of the second codec from a P-Access-Network-Info ("PANI") header or a Session Description Protocol ("SDP") component of a SIP message.

5. The device of claim 1, wherein the one or more processors are further configured to:

transcode between the first codec and the second codec in response to the first UE engaging in the first session with the second codec and the second UE engaging in the first session with the first codec.

6. The device of claim 1, wherein the one or more processors are further configured to:
track the quality of service at the particular RAN over a period of time;
determine instances of service degradation at the particular RAN corresponding to a plurality of times over the period of time at which the quality of service at the particular RAN does not satisfy the performance criteria; and
correlate each instance of service degradation to one or more events occurring at a same time around the particular RAN.

7. The device of claim 6, wherein the one or more processors are further configured to:
generate a predictive model based on a pattern between service degradation occurring at the particular RAN and a particular event taking place at the same time; and
provide transcoding between the first codec and the second codec for sessions originating from the particular RAN during a third time period based on the predictive model indicating recurrence of service degradation after the third time period, and wherein the quality of service of the particular RAN during the third time period satisfies the performance criteria.

8. The device of claim 1, wherein the one or more processors are further configured to:
receive, before a third time period, event data that forecasts a particular event taking place around the particular RAN during the third time period;
predict that the quality of service at the particular RAN will not satisfy the performance criteria during the third time period based on past occurrence of the particular event degrading quality of service at the particular RAN; and
provide transcoding between the first codec and the second codec for sessions originating from the particular RAN before the third time period in response to said predicting.

9. A method, further comprising:
determining that quality of service at a particular Radio Access Network ("RAN") does not satisfy performance criteria during a first time period;
receiving, during the first time period, a first request to establish a first session between a first User Equipment ("UE") and a second UE, the first request indicating a first codec and a second codec supported by the first UE;
adding an identifier of the particular RAN to a list of RANs;
forwarding the first request with an indication of the first codec and the second codec to the second UE in response to determining that the quality of service at the particular RAN does not satisfy the performance criteria during the first time period, wherein forwarding the first request is in response to matching the identifier of the particular RAN from the first request to the identifier of the particular RAN in the list of RANs;
determining that the quality of service at the particular RAN satisfies the performance criteria during a second time period that is different from the first time period;
receiving a second request to establish a second session between the first UE and the second UE during the second time period, the second request indicating the first and second codecs; and
disabling availability of the second codec for the second session prior to establishing the second session by providing a modified request, that omits the second codec, in response to determining that the quality of service at the particular RAN satisfies the performance criteria during the second time period.

10. The method of claim 9, further comprising:
allocating resources to transcode between the first codec and the second codec for sessions originating from the particular RAN in response to determining that the quality of service at the particular RAN does not satisfy the performance criteria during the first time period.

11. The method of claim 9, wherein providing the modified request comprises:
issuing a Session Initiation Protocol ("SIP") message, instead of the second request, with an offer of the first codec and without an offer of the second codec to one or more of a Media Resource Function ("MRF") or the second UE.

12. The method of claim 9, wherein disabling availability of the second codec comprises:
removing an offer of the second codec from a P-Access-Network-Info ("PANI") header or a Session Description Protocol ("SDP") component of a SIP message.

13. The method of claim 9, further comprising:
transcoding between the first codec and the second codec in response to the first UE engaging in the first session with the second codec and the second UE engaging in the first session with the first codec.

14. A non-transitory computer-readable medium, storing a plurality of processor-executable instructions to:
determine that quality of service at a particular Radio Access Network ("RAN") does not satisfy performance criteria during a first time period;
receive, during the first time period, a first request to establish a first session between a first User Equipment ("UE") and a second UE, the first request indicating a first codec and a second codec supported by the first UE;
add an identifier of the particular RAN to a list of RANs;
forward the first request with an indication of the first codec and the second codec to the second UE in response to determining that the quality of service at the particular RAN does not satisfy the performance criteria during the first time period, wherein forwarding the first request is in response to matching the identifier of the particular RAN from the first request to the identifier of the particular RAN in the list of RANs;
determine that the quality of service at the particular RAN satisfies the performance criteria during a second time period that is different from the first time period;
receive a second request to establish a second session between the first UE and the second UE during the second time period, the second request indicating the first and second codecs; and
disable availability of the second codec for the second session prior to establishing the second session by providing a modified request, that omits the second codec, in response to determining that the quality of service at the particular RAN satisfies the performance criteria during the second time period.

15. The non-transitory computer-readable medium of claim 14, wherein the plurality of processor-executable instructions further includes instructions to:

allocate resources to transcode between the first codec and the second codec for sessions originating from the particular RAN in response to determining that the quality of service at the particular RAN does not satisfy the performance criteria during the first time period.

16. The non-transitory computer-readable medium of claim 14, wherein the plurality of processor-executable instructions further includes instructions to:
track the quality of service at the particular RAN over a period of time;
determine instances of service degradation at the particular RAN corresponding to a plurality of times over the period of time at which the quality of service at the particular RAN does not satisfy the performance criteria; and
correlate each instance of service degradation to one or more events occurring at a same time around the particular RAN.

17. The non-transitory computer-readable medium of claim 16, wherein the plurality of processor-executable instructions further includes instructions to:
generate a predictive model based on a pattern between service degradation occurring at the particular RAN and a particular event taking place at the same time; and
provide transcoding between the first codec and the second codec for sessions originating from the particular RAN during a third time period based on the predictive model indicating recurrence of service degradation after the third time period, and wherein the quality of service of the particular RAN during the third time period satisfies the performance criteria.

18. The non-transitory computer-readable medium of claim 14, wherein the plurality of processor-executable instructions further includes instructions to:
receive, before a third time period, event data that forecasts a particular event taking place around the particular RAN during the third time period;
predict that the quality of service at the particular RAN will not satisfy the performance criteria during the third time period based on past occurrence of the particular event degrading quality of service at the particular RAN; and
provide transcoding between the first codec and the second codec for sessions originating from the particular RAN before the third time period in response to said predicting.

19. The non-transitory computer-readable medium of claim 14, wherein the processor-executable instructions to provide the modified request include instructions to:
issue a Session Initiation Protocol ("SIP") message with an indication of the first codec.

20. The non-transitory computer-readable medium of claim 19, wherein the SIP message is issued to the second UE.

* * * * *